US010994761B2

(12) United States Patent
Chappell (10) Patent No.: US 10,994,761 B2
(45) Date of Patent: May 4, 2021

(54) LOW PROFILE CART WITH ACCESS RAMP

(71) Applicant: Susan Chappell, Huntington Beach, CA (US)

(72) Inventor: Susan Chappell, Huntington Beach, CA (US)

(*) Notice: Subject to any disclaimer, the term of this patent is extended or adjusted under 35 U.S.C. 154(b) by 121 days.

(21) Appl. No.: 16/359,994

(22) Filed: Mar. 20, 2019

(65) Prior Publication Data

US 2020/0298897 A1 Sep. 24, 2020

(51) Int. Cl.
*B62B 3/00* (2006.01)
*B62B 3/02* (2006.01)
*B62B 5/00* (2006.01)
*A01K 1/00* (2006.01)
*B62B 5/06* (2006.01)

(52) U.S. Cl.
CPC ............. *B62B 3/02* (2013.01); *A01K 1/0035* (2013.01); *B62B 3/002* (2013.01); *B62B 5/0013* (2013.01); *B62B 5/067* (2013.01); *B62B 2202/42* (2013.01)

(58) Field of Classification Search
CPC .... B62B 1/10; B62B 1/12; B62B 3/02; B62B 3/022
USPC .............................................. 280/640, 47.34
See application file for complete search history.

(56) References Cited

U.S. PATENT DOCUMENTS

| | | | | |
|---|---|---|---|---|
| 3,621,819 A * | 11/1971 | Hooper | ............. | A61D 3/00 119/727 |
| 4,349,210 A * | 9/1982 | Rutt | ............. | A01K 1/0236 280/47.21 |
| 4,444,405 A * | 4/1984 | Barrus | ............. | B62B 1/12 280/47.3 |
| 4,601,632 A * | 7/1986 | Agee | ............. | B60P 1/431 14/71.1 |
| 4,796,565 A * | 1/1989 | Charbeneau | ............. | A01K 1/0236 119/727 |
| 5,113,793 A * | 5/1992 | Leader | ............. | A01K 1/0245 119/453 |
| 5,257,894 A * | 11/1993 | Grant | ............. | B60P 1/431 414/537 |
| 5,330,212 A * | 7/1994 | Gardner | ............. | B62B 1/20 280/40 |
| 5,380,144 A * | 1/1995 | Smith | ............. | A61G 3/061 14/71.3 |
| 5,480,180 A * | 1/1996 | Fuller | ............. | B62D 21/20 280/491.1 |
| 5,620,193 A * | 4/1997 | Dschaak | ............. | B62B 1/22 280/47.31 |

(Continued)

OTHER PUBLICATIONS

Pet Gear Inc, product page for Pet Gear NO-Zip Stroller, downloaded from https://www.amazon.com/dp/B073WXCYQH?tag=dogsrecom-20 on Mar. 20, 2019.

(Continued)

*Primary Examiner* — Jeffrey J Restifo
(74) *Attorney, Agent, or Firm* — Louise S. Heim (57) ABSTRACT

A low-profile cart for transporting a large disabled animal includes a bed box supported by a set of wheels. The bed box includes set of railings that are detachably secured to a lower base portion. Cut-outs in the front and rear sections of the lower base portion support a ramp that allows the animal to easily enter and exit the cart from either side without having to turn around.

18 Claims, 6 Drawing Sheets

(56) References Cited

U.S. PATENT DOCUMENTS

| | | | | |
|---|---|---|---|---|
| 5,673,928 A * | 10/1997 | Jury | ............... | B62B 1/208 280/47.24 |
| 5,687,978 A * | 11/1997 | Rhodes | ............... | B62B 1/208 280/30 |
| 5,853,189 A * | 12/1998 | Swartzlander | ............... | B62B 1/20 280/652 |
| 5,873,582 A * | 2/1999 | Kauffman, Jr. | ............... | B62B 1/04 280/643 |
| 5,887,879 A * | 3/1999 | Chumley | ............... | B62B 1/125 280/40 |
| 6,017,081 A * | 1/2000 | Colby | ............... | B60P 3/341 296/168 |
| 6,029,060 A | 2/2000 | Ashby | | |
| 6,079,941 A * | 6/2000 | Lee | ............... | B62B 3/04 16/35 R |
| 6,139,029 A * | 10/2000 | Shaw | ............... | B62B 1/206 280/47.371 |
| 6,199,508 B1 * | 3/2001 | Miale | ............... | A61D 3/00 119/28.5 |
| 6,217,043 B1 * | 4/2001 | Chumley | ............... | B62B 1/125 280/40 |
| 6,260,864 B1 * | 7/2001 | Smith | ............... | B62B 1/04 280/47.26 |
| 6,267,080 B1 * | 7/2001 | Roy | ............... | A01K 1/02 119/453 |
| 6,283,496 B1 * | 9/2001 | Dickmann | ............... | B62B 1/208 280/40 |
| 6,308,968 B1 * | 10/2001 | Hollingsworth | ............... | B62B 1/206 280/47.24 |
| 6,516,919 B1 * | 2/2003 | Sempel | ............... | A01M 31/02 182/187 |
| 6,604,749 B2 * | 8/2003 | Woodbury | ............... | A22B 7/006 280/47.35 |
| 6,688,635 B1 * | 2/2004 | Watts | ............... | B62B 1/206 280/47.24 |
| 6,732,676 B1 * | 5/2004 | Smith | ............... | A01K 1/0245 119/496 |
| 6,811,179 B2 * | 11/2004 | Woods | ............... | B62B 1/206 280/63 |
| 6,811,180 B1 * | 11/2004 | Molliere | ............... | A01M 31/006 182/116 |
| 6,913,271 B2 * | 7/2005 | Gordon | ............... | A01K 1/0236 119/453 |
| 6,991,249 B2 * | 1/2006 | Shapiro | ............... | B62B 1/206 280/47.34 |
| 6,991,250 B2 * | 1/2006 | Lindsey | ............... | B62B 1/12 280/30 |
| 7,172,207 B2 * | 2/2007 | Henry | ............... | B60D 1/00 280/40 |
| 7,175,205 B2 * | 2/2007 | Simpson | ............... | B62D 63/061 280/47.34 |
| 7,708,299 B2 * | 5/2010 | Duval | ............... | B62D 63/061 280/401 |
| 7,780,185 B2 * | 8/2010 | McConkey | ............... | B62D 63/061 280/656 |
| 7,793,744 B1 * | 9/2010 | Hardie | ............... | B62B 1/12 180/19.1 |
| 7,967,325 B1 * | 6/2011 | Burton | ............... | A01M 31/02 280/656 |
| 7,976,264 B1 * | 7/2011 | Pope | ............... | B60P 1/431 414/480 |
| 8,141,887 B1 * | 3/2012 | Poteat | ............... | B62B 1/12 280/47.24 |
| 8,366,125 B2 * | 2/2013 | Loomans | ............... | B62B 3/009 280/47.17 |
| 8,651,063 B1 * | 2/2014 | Learakos | ............... | A01K 13/006 119/843 |
| 8,714,111 B2 * | 5/2014 | Bryson | ............... | A01K 1/0245 119/496 |
| 8,926,254 B2 * | 1/2015 | Pocobello | ............... | A61G 3/061 414/537 |
| 8,950,767 B2 * | 2/2015 | Carter | ............... | A01K 1/0035 280/204 |
| 9,266,458 B2 * | 2/2016 | Michaud | ............... | B60P 1/431 |
| 9,623,924 B2 * | 4/2017 | Huskey | ............... | B62K 27/02 |
| 9,986,731 B2 * | 6/2018 | Mitchell | ............... | A01M 31/006 |
| 10,017,092 B1 * | 7/2018 | Chastain, Jr. | ............... | B60P 1/431 |
| 10,561,483 B2 * | 2/2020 | Funk | ............... | A61G 1/003 |
| 10,568,786 B1 * | 2/2020 | Nunn | ............... | B60P 1/43 |
| 2003/0193156 A1 * | 10/2003 | Norris | ............... | B62B 1/264 280/204 |
| 2003/0205885 A1 * | 11/2003 | Woods | ............... | B62B 3/009 280/652 |
| 2004/0084864 A1 * | 5/2004 | Casey | ............... | B62D 51/06 280/47.31 |
| 2007/0262562 A1 * | 11/2007 | Senatore | ............... | B60D 1/54 280/491.1 |
| 2009/0101084 A1 | 4/2009 | Robinson et al. | | |
| 2009/0302564 A1 * | 12/2009 | Evans | ............... | A01K 45/005 280/47.38 |
| 2010/0253023 A1 * | 10/2010 | Loomans | ............... | B62B 3/009 280/47.17 |
| 2014/0356117 A1 * | 12/2014 | Barger | ............... | B60P 1/431 414/523 |

OTHER PUBLICATIONS

Pet Gear Inc, product page for Pet Gear Full Length Tri-Fold Pet Ramp, dowloaded from https://www.chewy.com/pet-gear-full-length-tri-fold-pet/dp/49524 on Mar. 20, 2019.

Pet Gear Inc., product page for Pet Gear Free-standing Extra-Wide Carpeted Pet ramp, downloaded from https://www.chewy.com/pet-gear-free-standing-extra-wide/dp/125535 on Mar. 20, 2019.

* cited by examiner

LOW PROFILE CART WITH ACCESS RAMP

CROSS-REFERENCE TO RELATED APPLICATIONS

This application claims priority from U.S. provisional patent application No. 62/645,371, filed Mar. 20, 2018.

BACKGROUND OF THE INVENTION

1. Field of the Invention

The present disclosure relates in general to animal transportation. More particularly, this disclosure relates to a non-motorized cart for transporting large and\or heavy animals. In a further and more specific aspect, the disclosure relates to a low-profile, easily loadable cart for transporting mobility-challenged canines.

2. Background Art

The benefits of walking dogs are well known. Among other things, walks help control dogs' energy levels, prevent them from becoming overweight, and expose them to an array of changing sights, sounds, and smells that stimulate their senses and keep them mentally and emotionally healthy. They also provide an opportunity to socialize with humans and other dogs. As dogs become older, their energy levels may decrease, but their need to be outdoors and to experience a wide variety of changing sights and sounds and smells does not. When deprived of the stimulation that ordinarily comes from walking, older dogs, like younger dogs, can suffer from stress, depression, and mental decline. Unfortunately, providing such stimulation is difficult for dogs whose mobility is impaired because of bone, joint, or muscle issues.

Currently, the pet product industry offers a variety of transportation devices that are suitable for small-framed dogs, both with and without mobility issues, and for medium-framed dogs without mobility issues. These devices include hand-held or strap-on carrying bags, strollers, and even bike trailers. However, none of these commercially available devices are appropriate for transporting mobility-impaired, medium-frame, large, or giant breed dogs. For instance, even though certain pet strollers are advertised as being suitable for dogs weighing up to 150 pounds, the seat or floor of these strollers is located relatively high off the ground, making it inaccessible to a dog that cannot raise its feet more than a few inches off the ground, and inadvisable for a dog owner who risks fatigue, muscle tears, back injuries, and a host of other painful physical conditions when lifting the dog to the stroller. In addition, many of these strollers support the dog in a seated position, offering no room to lay down or turn around.

Dog wheelchair carts are available for dogs with amputations or certain types of injuries or conditions affecting one or two legs. However, these carts essentially suspend the dog from a harness, taking stress off some joints, bones and muscles while increasing stress on others. Thus, they are only for suitable for some types of handicaps. For instance, a wheelchair cart may be useful for a dog with two injured legs and two healthy legs, since the wheels of the cart act as substitutes for the injured legs, while still allowing the dog to pull the cart with its two healthy legs. Unfortunately, dogs with more pervasive injuries or conditions such as osteoarthritis, degenerative joint disease, and sarcoma bone tumors may suffer more harm than good due to the strain these carts put on their already weakened frames. Accordingly, many dogs are not good candidates for wheelchair carts.

As a result, the pet carriers, strollers, trailers, and wheelchair carts that are currently on the market do not meet the transportation needs of the majority of disabled dogs. The failure of the pet supply industry to recognize this fact is astonishing, since bone, joint and muscle disorders such as hip dysplasia, elbow dysplasia, cervical spondylomyelopathy, osteoarthritis, bone cancers are very common in large, extra-large, and giant breed dogs. These dogs are much beloved members of their human families, and they deserve the very best of care.

In addition to the need for vehicles that can transport large, extra-large, and giant dogs for recreational purposes, there is a need for medical transport vehicles that can be used in veterinary facilities to transport large dogs and animals from the parking lot of the facility to the waiting room, from the waiting room to the examination room, and so forth. Currently, many facilities use gurneys or transport slings for transporting the animals, but these are uncomfortable and sometimes unsafe.

These and other issues are addressed by the present disclosure as summarized below.

SUMMARY OF THE INVENTION

The shortcomings of currently available pet transportation devices are overcome by the present invention, which comprises a low profile cart having an access ramp allowing a disabled animal to easily enter and exit the cart. The cart includes a large, sturdy, rectangular bed box, a set of wheels for supporting the bed box above the ground, and a ramp that extends between the ground and the bed box.

In one aspect of the invention, the height of the floor of the bed box above the ground is preferably approximately equal to the radius of the rear wheels. This gives the cart a very low profile, making it very accessible to a large disabled animal who cannot easily be lifted into the cart. The accessibility is enhanced still further by the ramp, which has a length at least 3.9 times that of the height of the floor of the bed box above the ground so that its angle of incline is no more than 15 degrees.

In another aspect of the invention, the bed box includes a lower base portion and an upper railing portion. The lower base portion includes base supports that extend vertically upwardly from the floor and form a raised perimeter around the floor, and an upper railing portion detachably coupled to the base supports. The configuration of the base supports and railings allows an animal in the bed box to be safely and securely supported, while still allowing a sense of openness and freedom. The railings are sufficiently high to protect the animal, yet not to high as to obstruct the animals' visibility, or to hinder his ability to smell, hear, and be stimulated by its surroundings. Furthermore, the detachability the railings from the base supports makes it easy to disassemble the bed box, so that it can be stored and carried in the pet owners' vehicle.

In another aspect of the invention, the lower base portion includes a cut-out for supporting and stabilizing an end of the ramp. In a further aspect, the ramp includes a narrow end portion that bends downwardly from the main body of the ramp and is configured to be inserted into the cut-out. In addition, the upper surface of the cut-out is covered with an anti-slip material that prevents the ramp from slipping relative to the bed box. This secure connection between the ramp and the bed box enhances the safety of the cart by preventing the possibility of the ramp tipping, causing the animal to lose its balance.

In still another aspect of the invention, cut-out portions are provided at both the front and rear ends of the cart, so that the ramp may be attached to either the front and the rear, allowing the animal to enter and exit from opposite ends of the cart. This eliminates the necessity of the dog having to turn around in or back out of the cart, both of which are difficult and painful for a disabled animal to do.

In yet another aspect, a pair of spaced-apart channels are mounted on the underside of the bed box, for storing the ramp when it is not in use.

In another aspect of the invention, the wheels of the cart are detachable from the bed box, increasing the convenience of storage.

In yet another aspect of the invention, the cart includes a detachable push bar that extends rearwardly and upwardly to allow a user to push the cart. The push bar reduces strain on the user's back and promotes good posture, in contrast to prior art pet carriers designed to be pulled.

In another aspect of the invention, the push bar supports a sun shade that is deployable to extend over the bed box and protect the animal from sunlight. The sun shade, which is supported by a bimini bar that is pivotably coupled to the push bar, includes a roof portion and two side flaps configured to hang along the sides of the cart. Both flaps may be folded and supported on the roof when only overhead shade is desired, and one or both may be allowed to hang down when sun protection is desired on one or both sides.

In still another aspect, all the mounting hardware for securing the detachable components to the bed box is located on the exterior of the bed box. Specifically, the support legs of the bimini bar are supported in tubular sleeves secured to outer walls of the bed box. The axles of the rear wheels are mounted in bushings that extend laterally outwardly from the outer sides of the bed box, and the swivel mounts for the front wheels are secured to the underside of the floor of the bed box. This placement of all mounting hardware on the outer sides of the bed box ensures that the inner surfaces of the bed box are substantially smooth, with no projections that could injure or cause discomfort to the animal in the cart.

DETAILED DESCRIPTION OF THE PREFERRED EMBODIMENT

Figure 1:
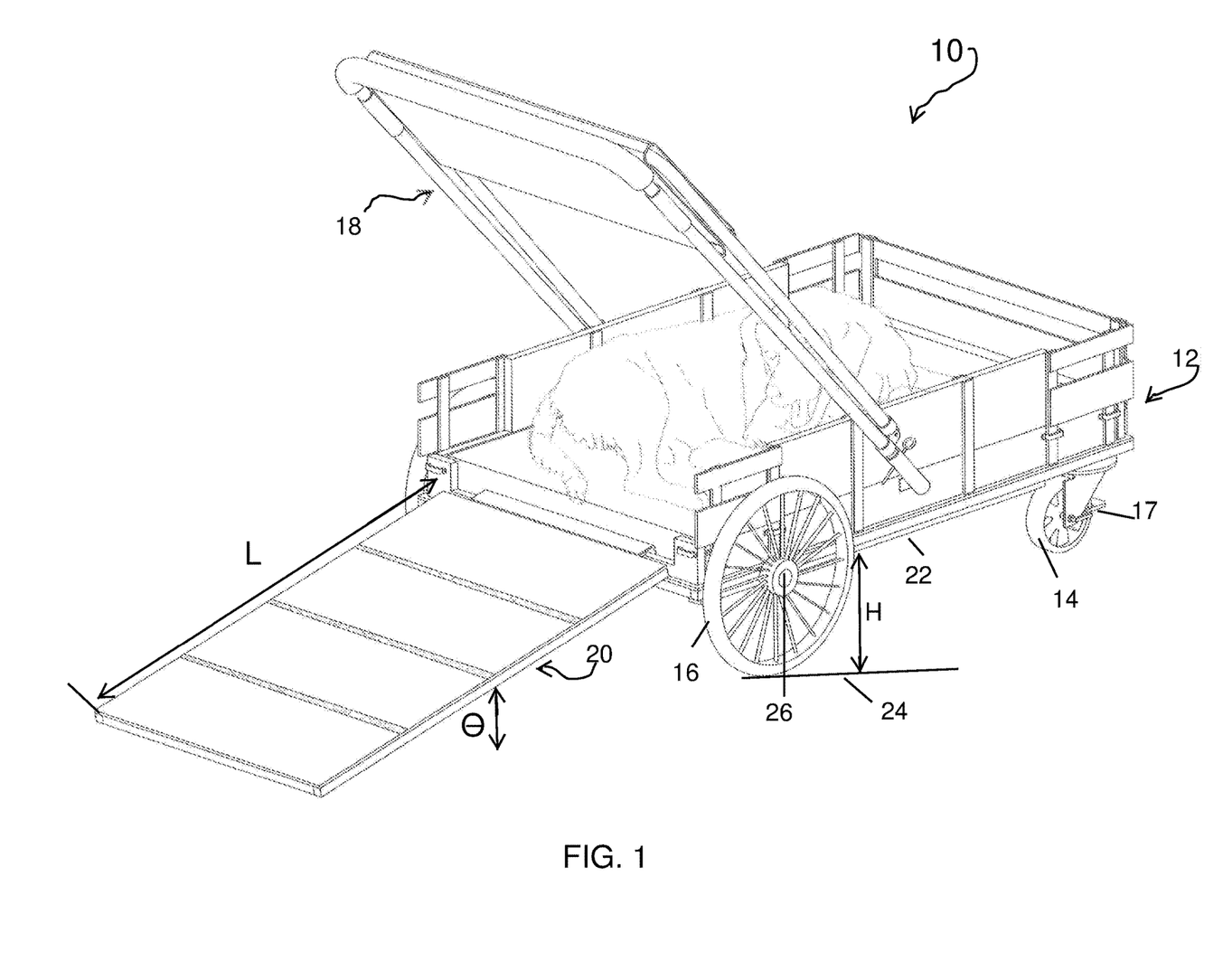
FIG. 1 is a perspective view showing an animal transport cart according to the present disclosure.

Turning now to the drawings, which are not necessarily to scale, and wherein some features may be exaggerated or minimized to show details of particular components, FIG. 1 shows a dog transport cart according to the present disclosure, indicated in its entirely by the numeral 10. The cart 10 comprises a large, sturdy, rectangular bed box 12 supported by front and rear wheels 14, 16. A push bar 18 extends upwardly and rearwardly from the bed box 12 to allow a dog's owner to easily push the cart 10 when desired. A ramp 20 is provided to allow a dog to be led into the bed box 12.

The bed box 12 may be made from a variety of materials, depending on the intended application of the dog cart 10. When the cart is intended for use in a veterinary office or hospital, all or most of the components should be made of stainless steel or aluminum, making it easily sterilizable and hygienic. When intended for recreational use, the railings and other components may be made of wood, giving the cart 10 a rustic or sporty look, or of any other materials having sufficient strength, durability, and comfort to accommodate a large, disabled animal.

The dimensions of the cart may also vary, depending on the size of dog or other animal to be transported, but should have a minimum width of no less than about 26 inches and a minimum length of no less than about 40 inches, in order to accommodate Dash Hounds, Bulldogs, Greyhounds, and other medium or large breeds of dogs weighing no more than 100 pounds. Carts for extra-large breeds such as Retrievers, German shepherds, Rottweilers, Sheep dogs, Huskies, and Bloodhounds weighing no more 200 pounds should have a minimum width of no less than about 28 inches and a minimum length of no less than about 45 inches. Carts for giant breeds such as Great Danes, Giant Mastiffs, St. Bernards, Newfoundlands, and Bernese Mountain Dogs weighing up to 350 pounds should have a minimum width of no less than about 35 inches and a minimum length of about 60 inches.

The cart 10 has a very low profile, making it easy for a large, heavy, disabled dog to step into the bed box 12. More specifically, the distance between the floor 22 of the bed box 12 and the ground 24 (ie. the height H of the floor 22 of the bed box 12) is preferably no more than 8-10 inches. In order to provide optimum stability, the radius of each rear wheel 16 of the cart 10 is preferably equal to the height H of the floor 22 of the bed box 12.

The rear wheels 16, which are mounted on axles 26 that extend laterally outwardly from the floor 22 of the bed box 12, have pneumatic tires that provide a smooth, bump-free ride.

The front wheels 14 of the cart 10 are preferably swivel-mounted casters, also with pneumatic tires. The casters preferably have a 360 degree turning radius, allowing maximum control and versatility. The casters are preferably mounted for quick-release from the bed box 12, and include brakes or locks 17 that allow the cart 10 to be safely parked.

The angle of incline $\theta$ between the ground 24 and the ramp 20 must be relatively small, preferably no more than 15 degrees, so that the climb to the bed box 12 is not too steep for a disabled dog. To ensure that the angle of incline $\theta$ is sufficiently small, the length L of the ramp 20 should be at least 3.9 times the height H of the floor 2 of the bed box 12.

Figure 2:
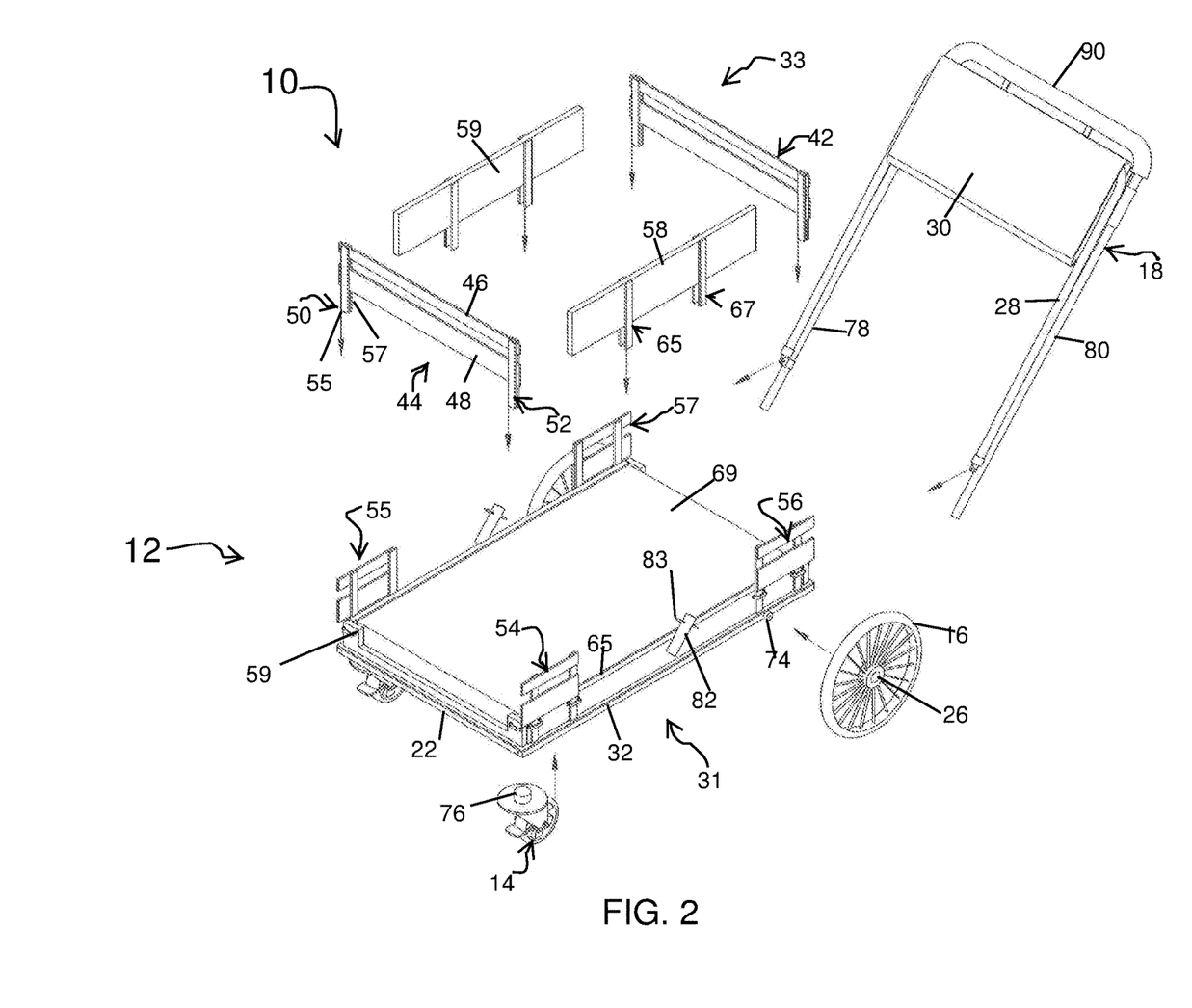
FIG. 2 is a perspective view showing elements of the animal transport cart in exploded relationship to one another.

As best seen in FIG. 2, the bed box 12 includes a lower base portion 31 having a raised perimeter 32. The height of the raised perimeter is preferably in the range of 3 to 6 inches. A railing set 33 is detachably secured to the raised perimeter. The railing set 33 includes a rear railing 42, a front railing 44, two front side railings 54, 55, two rear side railings 56, 57, and two side central railings 58, 59. The height of each railing in the railing set 33 is preferably in the range of 9 to 17 inches, so that when added to the base portion, the total height of the enclosure is in the range of 12 to 20 inches. Thus, the railings are sufficiently high to protect the animal, yet not so high as to obstruct the animal's field of vision.

The rear and front railings 42, 44 are preferably identical to one another, each including a pair of vertically spaced apart slats 46, 48 that extend horizontally between vertical supports 50, 52. Each vertical support 50, 52 comprises an outer post 55 that extends over the exterior surface of the slats 46, 48, and an inner post 57 that extends over the inner surface of the slats. The space between the inner and outer posts 55, 57 is configured to snugly receive an upper lateral edge 59 of the raised perimeter 32 of the bed box 12. The rear and front railings 42, 44 can easily be removed from the bed box to allow the ramp to be attached and the dog to enter or exit the bed box 12.

The two front side railings, 54, 55, and the two rear side railings 56, 57 are all identical in structure, each including a pair of vertically spaced apart slats 60, 62 that extend horizontally between vertical supports 64, 66. The vertical supports 64, 66 may be similar in structure to the vertical supports 50, 52 of the front and rear railings 42, 44, each comprising a pair of spaced apart posts that grip or extend over an upper 65 longitudinal edge of the raised perimeter 32 of the bed box 12.

The two side central railings 58, 59 each comprise a single, solid board extending horizontally between vertical supports 65, 67 that grip or extend over upper the longitudinal edge 65. The solid construction of the side central railings 58, 59 is designed to support the sides of the dog and to promote a sense of safety and security. In contrast, the slatted construction of the rear railing 42, front railing 44, and front and rear side railings 54, 55, 56, 57, 58 creates an airy, less restricted feeling that allows a dog lying on the floor to see, smell, and hear out of the front and rear of the bed box 12, thus receiving the sensory stimulation that is so vital to its mental and emotional health.

The lower base portion 31 of the bed box 12 supports a water-resistant foam pad 69 that cushions the dog in the bed, keeping it comfortable and well-supported. The foam pad 69 is preferably formed from a medium-density foam having the same length, width, and depth of the lower base portion 31 of the bed box 12. Its purpose is to absorb shock and dampen vibrations from any impacts the cart 10 may experience. In applications where the cart is being used as a medical transport cart at veterinary hospitals and the like, the foam pad 69 should washable and provided with disposable antimicrobial covers to prevent cross-contamination.

The push bar 18 includes a horizontally extending handle 90 and two vertically extending support legs 25, 27 that are releasably retained in upwardly and rearwardly angled pipe receiver mounts 82 provided on the exterior of the raised perimeter 32 of the base support portion 31 of the bed box 12. The support legs 25, 27 are locked into the pipe receiver mounts 82 by locking pins 83.

The push bar 18 is pivotably coupled to a bimini bar 28 that supports a sunshade 30, shown here in a retracted and folded position. The bimini bar 28 and sun shade 30 may be omitted on models of the cart 10 intended for use as medical transport vehicles at veterinary facilities where the occupant is not expected to be exposed to sunlight but are highly desirable in recreational models of the cart 10.

The axle 26 of each rear wheel 16 is releasably received in a bushing 74 that extends laterally outwardly from a side edge of the floor 22 of the bed box 12. The front wheels 14 are releasably secured to the floor 22 by pins or posts 76 that extend vertically into bores provided on the underside of the floor. These quick-release connections between the wheels 14, 16 and the floor 22, together with the easy detachability of the push bar 18 and the railing set 33, make the cart convenient to disassemble and store in a car or sports utility vehicle, and to quickly re-assemble when needed.

Figure 3:
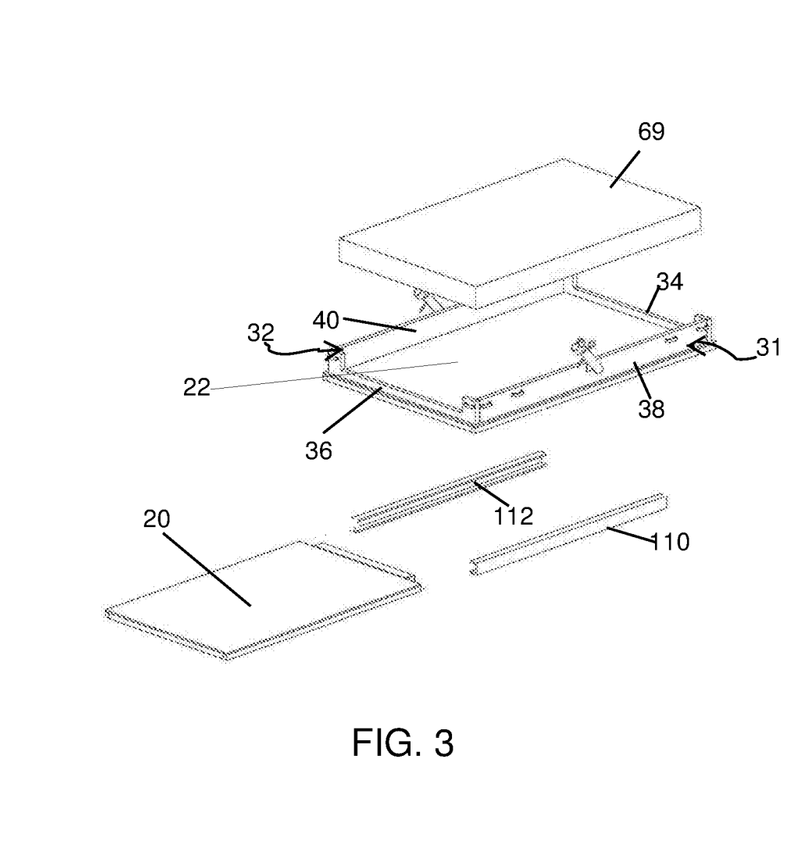
FIG. 3 is a perspective view showing other elements of the animal transport cart in exploded relationship to one another.

FIG. 3 shows the lower base portion 31 of the bed box in exploded relationship to the foam pad 69 and a pair of C-shaped support channels 110, 112 that slidably receive the edges of the ramp 20, allowing it to be conveniently stored below the cart when not in use. The lower base portion 31 includes the floor 22 and the raised perimeter 32. The raised perimeter includes a 34 rear base support 34 that extends vertically upwardly from the rear edge of the floor 22, a front base support 36 that extends vertically upwardly from the front edge of the floor 22, and a pair of side base supports 38, 40 that extend vertically upwardly from opposite side edges of the floor 22.

Figure 4:
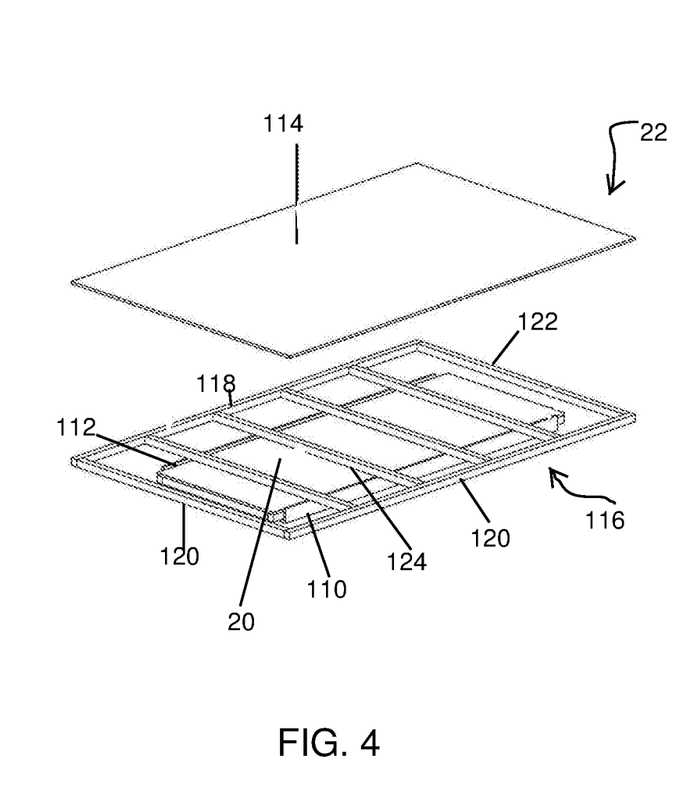
FIG. 4 is a perspective view showing elements of the floor of the cart in exploded relationship to one another.

FIG. 4 shows elements of the floor 22 in exploded relationship to one another. The floor 22 includes a thin plywood board or sheet 114 supported by a tubular aluminum frame 116. The tubular aluminum frame 116 comprises a pair of longitudinally extending side tubes 118, 120 joined at their ends by laterally extending end tubes 122 and at intermediate portions by a series of spaced apart cross tubes 124. The C-shaped channels 110, 112 for holding the ramp 20 are secured to the cross tubes 124 by bolts or other suitable fasteners.

Figure 5:
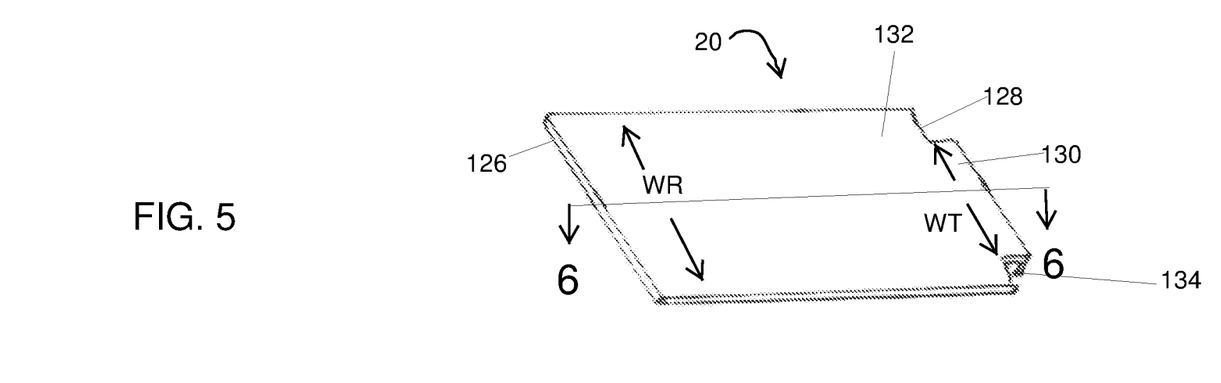
FIG. 5 is a perspective view showing a ramp of the animal transport cart.
Figure 6:
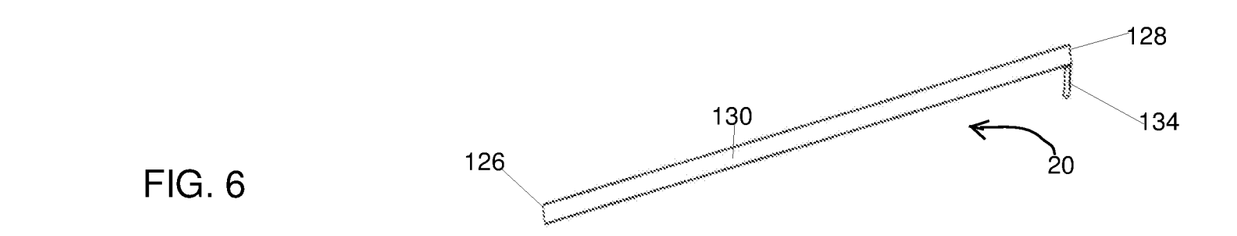
FIG. 6 is a sectional view taken through line 6-6 of FIG. 5.
Figure 7:
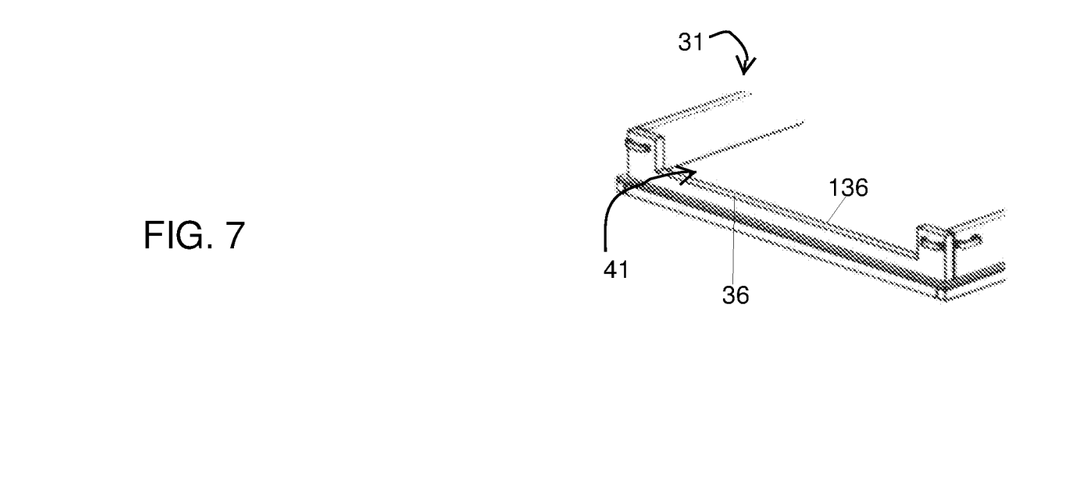
FIG. 7 is a perspective view showing one of the base support walls of the animal transport car.

As best seen in FIGS. 5-7, the ramp 20 has a loading end 126 and a connecting end 128. The connecting end 128 of the ramp 20 includes a tab 130 that is configured to be inserted into a cut-out 41 in the rear base support 34. The tab 130, which has a width $W_T$ that is less than the width $W_R$ of the body portion 132 of the ramp 120, includes a down-turned portion 134 that hooks over the top surface 136 of the cut-out 41 and engages the interior surface of the rear base support. The top surface 136 of the cut-out is preferably coated with a slip-proof material such as rubber, preventing the ramp 20 from sliding relative to the cart.

The front base support preferably also includes a cut-out, allowing the ramp to be attached to either the front end or the rear end of the cart. This allows the dog to enter from one end of the cart and exit from the other, rather than having to back out or turn around.

Figure 8:
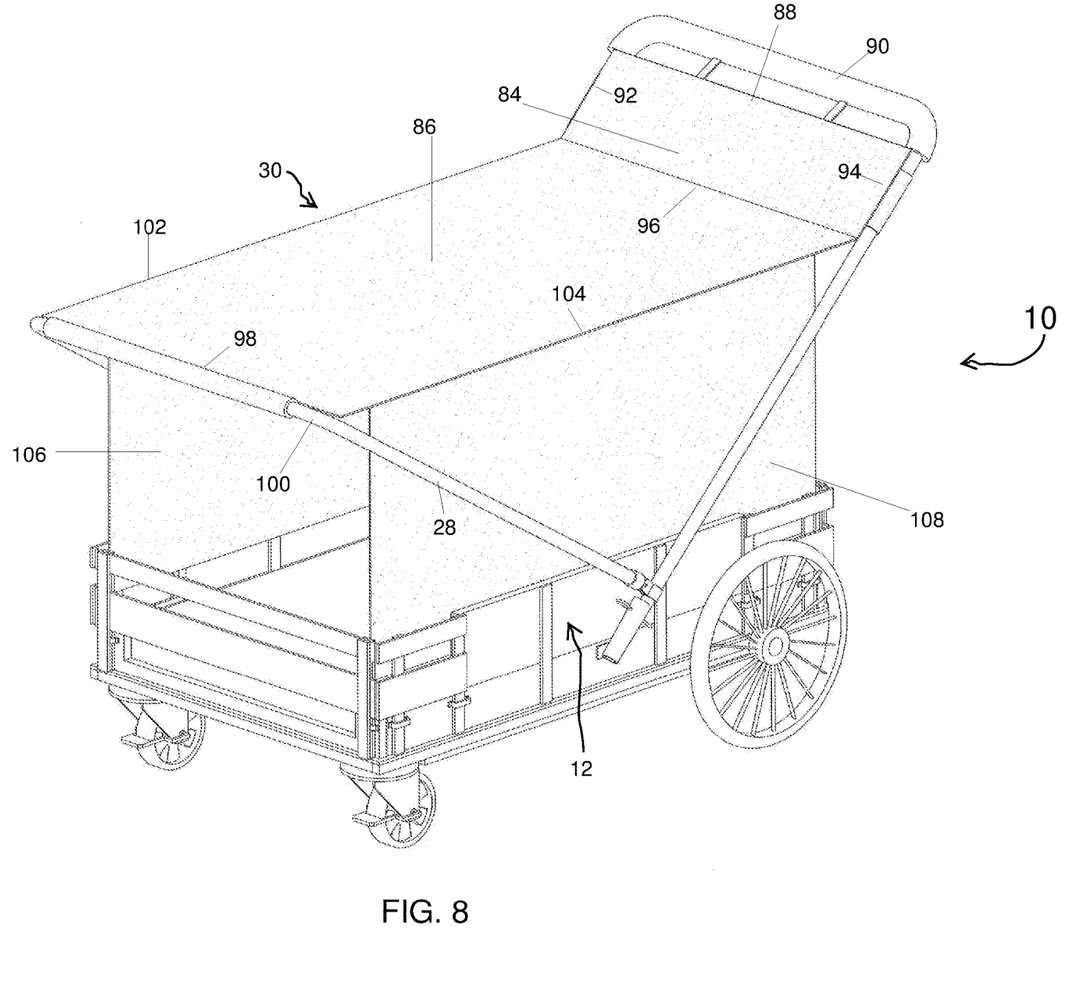
FIG. 8 is a perspective view showing the animal transport cart with its sun shade in a fully deployed configuration.
Figure 9A:
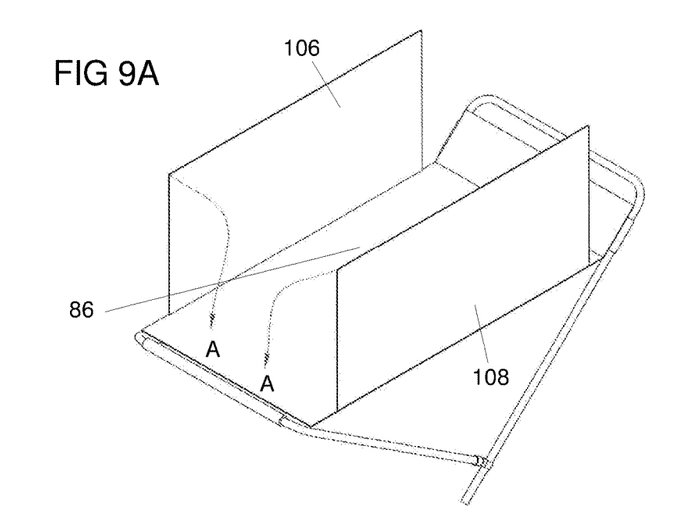
FIGS. 9A-9D show a process of folding and retracting the sun shade of the cart.
Figure 9B:
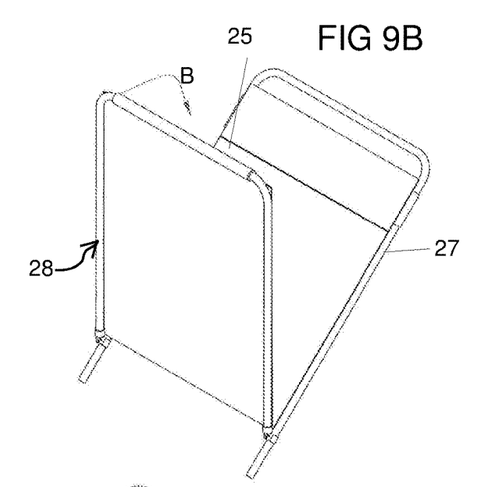
Figure 9C:
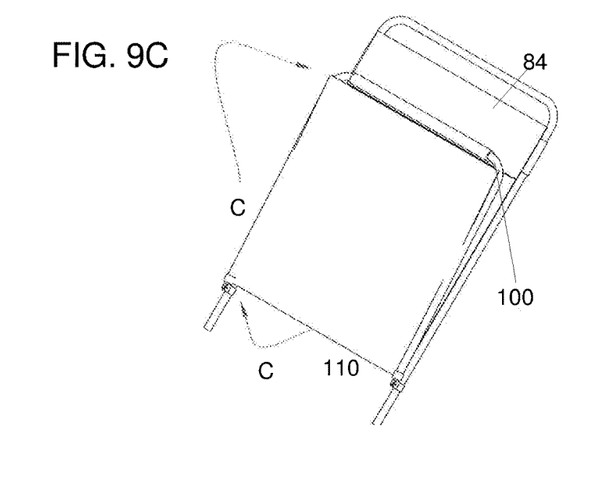
Figure 9D:
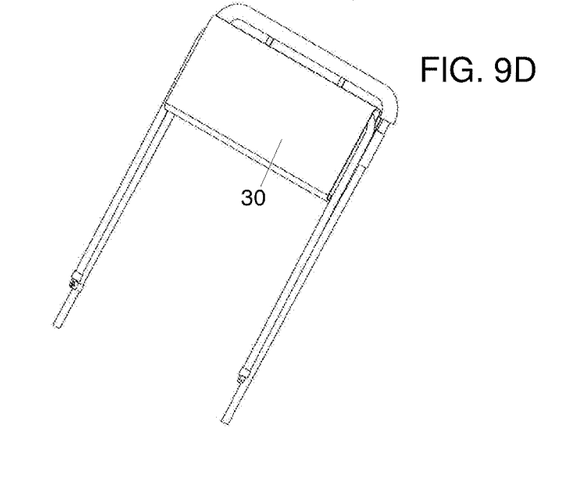

FIG. 8 shows the pet transport cart 10 with the bimini bar 28 pivoted to its forwardmost position and the sun shade 30 fully unfolded and extended to cover the bed box 12. The sun shade 30, which is preferably made from a high-quality, fine anti-UV mesh material, such as marine mesh, includes a rear panel 84 and a roof 86. The rear panel 84 includes a rear edge that extends substantially parallel to the handle 90 of the push bar 18, a pair of side edges 92, 94 that are attached to and extend parallel to the support legs of the push bar, and a front edge that joins the front panel 86 along a seam 96. The roof 86 includes a front edge 98 that is attached to and extends parallel to the horizontal top portion 100 of the bimini bar 28, and a pair of side edges 102, 104 that are secured to hanging side panels 106, 108. The bottom edges of the side panels 106, 108 may be secured to the sides of the bed box 12 by magnets or other suitable non-protruding fasteners.

When the sun shade 30 is not needed, it can be retracted and folded into the compact configuration shown in FIGS. 1 and 2 by following the steps illustrated in FIGS. 9A-9D. First, the side flaps are lifted and folded over the roof 86 as shown by arrows A in FIG. 9A. Next, the bimini bar 28 is pivoted to its rearmost position against the support legs 25, 27 of the push bar 18, as shown by arrow B in FIG. 9B. Then, the bottom edge 110 is folded upwardly as shown by arrows C in FIG. 9C, and tucked between the rear panel 84 and the horizontal top portion 100 of the bimini bar 28, resulting in the compact configuration of FIG. 9D. To redeploy y the sun shade 30, the user simply follows the process in reverse.

The two side panels 106, 108 may be left on top of the roof 86 if the user merely wants to protect the dog in the cart 10 from direct overhead sunlight, while still allowing unobstructed side views. Alternatively, one or both side panels 106, 108 may be unfolded and allowed to hang into one or both sides of the cart, to provide more complete protection from the sun.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cart for transporting a large disabled pet, comprising:
   a bed box configured to support and surround the pet, the bed box including a floor, a front, a rear, and a pair of opposed sides;
   a set of wheels configured to support the bed box a predetermined height above a surface, and to allow rolling movement above the surface, the set of wheels including a pair of rear wheels, each having a radius substantially equal to the predetermined height;
   a ramp configured to extend between the surface and the floor and to allow the disabled pet to walk into the cart;
   a push bar coupled to the sides of the bed box and extending angularly rearward and upward to allow a user to push the cart, the push bar including a pair of support legs, wherein each support leg is removably received in a tubular sleeve secured to the outer surface of the bed box;
   a sun shade supported by the push bar and deployable to extend over the bed box and protect the pet from sunlight; and
   a bimini bar having a lower end pivotably coupled to the push bar,
   wherein the sun shade includes
   a rear panel extending between the support legs of the push bar, and
   a front edge secured to an upper end of the bimini bar.

2. The cart according to claim 1, wherein the axle of each rear wheel is located a distance above the surface, wherein the distance is substantially equal to the predetermined height.

3. The cart according to claim 2, wherein each of the axles is supported in a bushing extending laterally outwardly from the floor of the bed box.

4. The cart according to claim 1, wherein the sun shade comprises:
   a roof portion extending between the rear panel and the front edge and configured to extend parallel to the floor of the bed box when the bimini bar is pivoted to a forward position; and
   a pair of side flaps coupled to opposite sides of the roof portion, where each side flap is foldable from a storage position wherein the flap is supported on top of on the roof portion to a deployed position wherein the flap hangs downwardly over a side of the cart.

5. The cart according to claim 1, further comprising a support structure under the floor of the bed box, wherein the support structure is configured to hold the ramp when not in use.

6. The cart according to claim 5, wherein the support structure comprises a pair of spaced-apart channels mounted to the floor of the bed box and configured to slidably receive opposite edges of the ramp.

7. A cart for transporting a large disabled pet, comprising:
   a bed box configured to support and surround the pet, the bed box including
   a floor
   a front base support extending vertically upwardly from the floor, the front base support including a cut-out portion,
   a rear base support extending vertically upwardly from the floor, the rear base support including a cut-out portion,
   a pair of opposed sides walls extending vertically upwardly from the floor and horizontally between the front and base support,
   a front railing detachably coupled to the front base support;
   a rear railing detachably coupled to the rear base support; and
   a set of wheels configured to support the bed box a predetermined height above a surface, and to allow rolling movement above the surface; and
   a ramp configured to extend between the surface and the floor and to allow the disabled pet to walk into the cart, the ramp including
   a main body portion having a predefined width; and
   an end portion having a width less than the predetermined width and configured to be inserted into the cut-out portions in the front and rear base supports to for a secure connection between the ramp and the bed box.

8. A cart for transporting a large disabled pet, comprising:
   a bed box configured to support and surround the pet, the bed box including a floor, a front, a rear, and a pair of opposed sides, the bed box comprising
   a lower base portion including the floor and a plurality of base supports that extend vertically upwardly from the floor and form a raised perimeter around the floor, and
   a railing set including a plurality of railings detachably coupled to the base supports;
   a set of wheels configured to support the bed box a predetermined height above a surface, and to allow rolling movement above the surface, the set of wheels including a pair of rear wheels, each having a radius substantially equal to the predetermined height; and
   a ramp configured to extend between the surface and the floor and to allow the disabled pet to walk into the cart;
   wherein the lower base portion of the bed box includes a cut-out configured to support and stabilize an end of the ramp.

9. The cart according to claim 8, wherein the ramp includes a loading end and an attachment end, wherein the attachment end is bent at an angle relative to the attachment end and is configured to be inserted into the cut-out.

10. The cart according to claim 9, wherein the attachment end of the ramp is narrower than the loading end of the ramp.

11. The cart according to claim 10, wherein the floor supports a cushioning pad configured to enhance the comfort of an animal in the cart, to absorb shock, and to dampen vibrations due to movement of the cart.

12. The cart according to claim 8, wherein:
the lower base portion includes
   a rear base support extending along the rear edge of the floor, the rear base support having a first cut-out configured to receive an end of the ramp,
   a front base support extending along the front edge of the floor, the front base support having a second cut-out configured to receive the end of ramp; and
the upper railing portion includes
   a rear railing detachably coupled to the rear base support, and
   a front railing detachably coupled to the front base support.

13. The cart according to claim 12, wherein each of the front and rear railings comprises:
a pair of vertically spaced apart, horizontally extending rails; and
a pair of vertical posts supporting the rails;
wherein each of the posts is removably received in a sleeve mounted on an external surface of a base support.

14. The cart according to claim 8, wherein:
the lower base portion includes a pair of side supports extending along opposite side edges of the floor; and
the upper railing portion includes two sets of side railings detachably coupled to the side supports, each set of side railings including
   a front side railing including a pair of vertically spaced apart, horizontally extending rails,
   a rear side railing including a pair of vertically spaced apart, horizontally extending rails, and
   a solid central portion.

15. The cart according to claim 8, further comprising a push bar coupled to the sides of the bed box and extending angularly rearward and upward to allow a user to push the cart.

16. The cart according to claim 15, wherein the push bar comprises a pair of support legs, wherein each support leg is removably received in a tubular sleeve secured an outer surface of the bed box.

17. The cart according to claim 15, further comprising a sun shade supported by the push bar and deployable to extend over the bed box and protect the pet from sunlight.

18. The cart according to claim 8, further comprising an anti-slip surface formed on the cut-out to prevent the ramp from slipping relative to the lower base support.

* * * * *